United States Patent Office 3,352,817
Patented Nov. 14, 1967

3,352,817
STABILITY OF POLYOLEFINES
Gerhard Meyer, Obernburg, Erhard Siggel, Seckmauren uber Hochst, Odenwald, Albert Schopf, Hering uber Hochst, Obenwald, and Helmut Magerlein, Erlenbach, Germany, assignors to Vereinigte Glanzstoff-Fabriken AG., Wuppertal-Elberfeld, Germany
No Drawing. Filed Jan. 26, 1965, Ser. No. 428,201
Claims priority, application Germany, Jan. 31, 1964, V 25,292
17 Claims. (Cl. 260—45.7)

ABSTRACT OF THE DISCLOSURE

Stabilization of a poly-α-monoolefine such as polypropylene against oxidation by dispersing it in finely divided form in an inert hydrocarbon liquid containing a small amount of (A) a boron halide or boron halide etherate such as $BF_3$ or $BF_3 \cdot O(C_2H_5)_2$ and (B) an organic peroxide such as di-tert.-butyl-peroxide, heating the dispersion at an elevated temperature, e.g. 50–150° C., usually for a period of about 30 minutes to 5 hours, and then separating the poly-α-monoolefine from the treating liquid. Examples of the inert hydrocarbon are hexane, heptane, cyclohexane, benzene, toluene and the like. The resulting stabilized poly-α-monoolefine is useful in producing filaments, films and molded articles resistant to oxidation.

---

This invention is concerned with a process for treatment of high molecular weight polyolefines so as to improve their stability against oxidation. More particularly, the invention relates to a method of contacting a polyolefine with a specific treating agent under conditions which are sufficient to enhance the oxidation-resistance of the resulting polyolefine product.

It is known that valuable products in the form of filaments, films, foils or other extruded or molded articles can be produced from polyolefines obtained by the addition polymerization of monomeric olefines, such as the alpha-monoolefines of from 2 up to about 10 carbon atoms. Especially favorable properties are exhibited by solid high molecular weight polyolefines which have been obtained by the so-called low pressure polymerization process requiring the use of a stereospecific catalyst or the so-called Ziegler catalysts. Although such polyolefines have advantageous properties such as high strength, high density, relatively higher melting points and general resistance to chemical attack, they exhibit a somewhat limited stability against attack by oxygen, especially where there is simultaneous application of heat and/or exposure to ultraviolet rays. The damage shown by polyolefins under such oxidation conditions has been attributed to the presence of double bonds in or on the molecular chain of the polymer, these double bonds or olefinically unsaturated portions of the molecule being particularly susceptible to attack by oxygen. It does not appear to be possible to prevent or avoil the occurrence of these double bonds by any special precautions during polymerization. Therefore, in order to improve the stability of the polyolefine, it is apparently necessary to subject the polymer to an after-treatment which will tend to saturate the double bonds.

For example, it has been suggested that the polymer be subjected to a treatment with certain silicon compounds in which at least one hydrogen atom is attached directly to the silicon atom. In this known process, the polyolefine must be dissolved in a solvent and stirred for a relatively long period of time together with the silicon compound and a suitable catalyst. Aside from the fact that this process requires the use of considerable amounts of solvents and precipitation agents, it is unusually expensive because a thorough purification must be carried out after the treatment with the silicon compound and precipitation of the treated polymer from its solution.

According to an alternative of this known process, the stabilizing treatment can also be carried out by mixing the polyolefine with the silicon compound in an extruder at elevated temperatures, e.g. 250–300° C. However, a uniform stabilization is not obtained in this manner. Furthermore, this process suffers from the disadvantage that the silicon compound remains in the polymer.

In another known process, hydrogenation of the double bonds has been attempted in order to solve the problem of stabilization. The polyolefine in the form of a solution, emulsion or suspension is conducted through a suitable hydrogenation reaction vessel where it is brought into contact with a specific hydrogenation catalyst. This process requires a considerable expenditure in apparatus and time and is not suitable for treating large amounts of polyolefines. Finally, this method is disadvantageous in that the treated polyolefine must be subjected to additional steps for removal of the heterogeneous hydrogen catalyst which would otherwise cause trouble in the normal processing of the polyolefine into finished articles.

The primary object of the present invention is to provide a process of treating a polyolefine which will lead to an improved product exhibiting better resistance to oxidation and aging, especially such oxidation as may occur in normal use of the polymer where it is exposed to heat and light.

Another object of the invention is to improve the stability of polyolefines against oxidation by a process or method which can be carried out in an economical manner and under easily controlled conditions.

Yet another object of the invention is to provide a process for improving the stability of polyolefines whereby conventional apparatus can be employed and the necessary steps can be readily combined with conventional polymerization processes for the production and separation of a substantially pure polyolefine.

Still another object is to improve the polyolefine stability by a process which permits the treatment of large quantities of the polymer on a commercial scale.

These and other objects and advantages of the invention will become more apparent after considering the following detailed specification.

It has now been found, in accordance with the present invention, that an improved polyolefine product can be obtained by dispersing the polyolefine in an inert hydrocarbon liquid containing a small amount each of (A) a boron halide or a boron halide etherate, and (B) an organic peroxide, and heating this dispersion with mixing or agitation at an elevated temperature up to the boiling point of the inert hydrocarbon liquid, e.g. from about 50° C. to 150° C. and preferably about 60°–120° C., for a period of time sufficient to enhance the oxidation-resistance of the polyolefine. The polyolefine is then separated from the dispersion, for example, by filtration, and is then preferably washed two or more times with the inert hydrocarbon liquid and finally dried by evaporation or distilling off any adherent hydrocarbon liquid.

The process of the present invention is particularly advantageous for the treatment of poly-alpha-monoolefines of from 2 up to about 8 carbon atoms in the monomeric alpha-monoolefine, and especially good results have been achieved with the treatment of the polyolefines of the 3 to 6 carbon atom monomers, e.g. polypropylene, polybutylene or poly-4-methylpentene-1. The results are also quite significant where the treatment is applied to stereoregulated or isotactic polyolefines as obtained by polymerization of the olefine under low pressure conditions in the presence of particular catalyst systems commonly referred to as stereospecific catalyst. These catalyst systems are well known in this art as well as the polymerization conditions and methods of recovering the isotactic polymer product, the preferred Ziegler catalyst contains TiCl₃ in combination with a trialkyl aluminum, e.g. triethyl aluminum.

The process of the invention is most conveniently carried out after the polyolefine has been purified, i.e. after polymerization has taken place and the polymer has been purified by removing and recovering the catalyst components therefrom. In the case of Ziegler type catalysts which are acid-soluble, the polymerization product is extracted with alcoholic-HCl, e.g. weak HCl in methanol, and the polymer is then washed and/or neutralized for substantially complete removal of the extractant and catalyst components. At this point, the purified polyolefine is in the form of a finely divided powder which can be readily subjected to the stabilizing treatment of the invention. Furthermore, the preceding steps are carried out in conventional apparatus with the substantial exclusion of oxygen and water, and the purified polyolefine can then be treated in the same apparatus under the same conditions of an oxygen-free and moisture-free environment, thereby avoiding any procedural complications in the overall process.

The purified polyolefine powder is normally obtained in conventional polymerization processes in a particle size which is quite suitable for the stabilizing treatment of the invention within a reasonable period of time. Smaller particles can usually be treated at lower temperatures and/or shorter periods of time. In general, it is desirable to use particle sizes of about 0.1 mμ to 500 mμ.

The boron compound employed as the treating agent can be added to the inert hydrocarbon in small amounts of at least 0.01% and preferably about 0.1 to 1% by weight, with reference to the total amount of the polyolefine. Somewhat higher amounts of the boron compound, e.g. up to 2% or even 5% by weight, can also be employed but without any special advantage.

Suitable boron compounds include the boron halides, i.e. BF₃, BCl₃, BBr₃ and BI₃, preferably the boron trifluoride or boron trichloride. The boron halide etherates are complex compounds in which a molecule of the boron halide is combined with an ether, preferably a lower dialkyl ether such as dimethyl ether, diethyl ether or dipropyl ether. The boron halide may also be combined with a heterocyclic ether such as butylene oxide. These etherates can be obtained by known methods; boron trifluoride etherate can be prepared, for example, by vapor-phase reaction of the anhydrous ether with BF₃ as disclosed in Laubengayer, Finlay, J. Am. Chem. Soc. 65, 884 (1943). Suitable boron halide etherates include the following:

BF₃·OC₄H₈, BF₃·O(C₂H₅)₂, BCl₃·O(C₂H₅)₂
BCl₃·OC₄H₈, BF₃·O(n-C₃H₇)₂, BCl₃·O(n-C₃H₇)₂
BF₃·O(i-C₃H₇)₂, BCl₃·O(i-C₃H₇)₂, BF₃·O(n-C₄H₉)₂
BCl₃·O(n-C₄H₉)₂, BF₃·O(C₆H₁₁)₂, BCl₃·O(C₆H₁₁)₂
BF₃·C₆H₅OCH₃, BCl₃·C₆H₅OCH₃, BF₃·C₆H₅OC₂H₅
BCl₃·C₆H₅OC₂H₅

The organic peroxide is added in an amount of at least 0.001% and preferably 0.01 to 0.1% by weight, with reference to the polyolefine, and generally not more than about 1% by weight. Preferred organic peroxides are as follows: dialkyl-peroxides, such as di-tert.-butyl-peroxide; diacyl-peroxides, such as dibenzoyl-peroxide, diacetyl-peroxide, or dilauroyl-peroxide; ketone peroxides such as cyclohexanone peroxide or methylethylketone peroxide; or other peroxides such as dicumyl-peroxide, or tert.-butyl-perbenzoate. Still other suitable organic peroxides include the following: di-t-amyl peroxide, 2,2-bis-(t-butylperoxide)-butane, cumene hydroperoxide, t-butyl hydroperoxide, methylcyclohexyl hydroperoxide, p-menthane hydroperoxide, methylamylketone peroxide, acetyl benzoyl peroxide, disuccinyl peroxide, 2,4-dichlorobenzoyl peroxide, dicaproyl peroxide, t-butyl permaleic acid, di-t-butyl perphthalate, isopropyl percarbonate, peracetic acid, dibutyryl peroxide, t-butyl peracetate, hydroxyheptyl peroxide, 1-hydroxycyclohexyl hydroperoxide-1, dibenzaldi-peroxide.

The inert hydrocarbons which can be used as an inert liquid dispersing medium for the stabilizing treatment include the following: pentane, hexane, heptane, benzine, benzene, toluene, xylene, Decalin, Tetralin and diesel oil. Of course, it is also possible to use mixtures of these inert hydrocarbons or to use a different hydrocarbon liquid for washing than is used during the treatment itself, but it is generally more convenient to use just one liquid for all of the process steps.

It is preferable to employ an inert hydrocarbon as the dispersing agent which is easily volatilized because it is then much easier to separate and recover the liquid hydrocarbon after the stabilization treatment is completed. For example, it is especially preferred to employ liquid hydrocarbons with boiling points below about 100° C.

The temperatures and periods of time for any specific treatment obviously depend on a number of different factors. At higher temperatures, the treatment can be completed more quickly. In order to shorten the treatment period, it is also possible to work under elevated pressure in a closed vessel at temperatures which extend up to the boiling point of the hydrocarbon dispersing agent at the pressure being considered. Thus, by working under pressure, low-boiling hydrocarbon liquids can be used at much higher temperatures to obtain correspondingly shorter periods of treatment. In general, the process of the invention is best carried out under the preferred temperature conditions for treatment periods of about 30 minutes to 5 hours.

By comparison with previously known stabilizing methods, the process of the present invention offers the advantage that it can be carried out directly in conjunction with the purification of the polymer without interfering with the normal polymerization or the separation and recovery of the polymerization catalyst and purified polymer. All of the hydrocarbon dispersing agents suitable for the stabilizing process are also solvents which have been found to be useful in the preceding purification process. The excess dispersing liquid can be separated by filtration or centrifuging, and the polymer is easily purified to remove substantially all of the treating agents by a simple washing with an inert hydrocarbon liquid. Thus, it is possible to avoid a special purification as is required in known methods which use a heterogeneous catalyst for the stabilizing treatment. A much more uniform and extensive stabilizing is obtained by contacting the polyolefine powder with the compounds contained in the dispersing agent according to the invention than is possible by incorporating or engraining a stabilizing agent into the polymer.

The process of the invention is further illustrated but not limited by the following examples.

*Examples 1–7*

In a 1-liter two-necked flash equipped with an agitator and reflux condenser, 100 grams of polypropylene or poly-4-methylpentene-1 were dispersed in 600 ml. of a suitable hydrocarbon dispersing agent under a nitrogen atmosphere (see the table below for the details of each example). The polymers were produced by polymerization of propylene or 4-methylpentene-1 in the presence of aluminum triethyl and TiCl₃ an a stereospecific catalyst. After completion of the polymerization, the polymer was purified with hexane and with methanol in admixture with hydrochloric acid, washed neutral and then dried. To this dispersion there was added the boron compound as a treating agent as well as the organic peroxide. The dispersion was then heated with agitation at the temperature and for the period of time shown in the table. The dispersing agent was then filtered off, the powder washed twice, each time with 100 ml. of the hydrocarbon employed as the dispersing agent, and the polymer powder was finally dried under nitrogen. The stability of the dry sample against oxidation was then determined.

hydroperoxide-1, dibenzaldiperoxide and or dispersing agents such as pentane, octane, isooctane, benzine, cyclo-

TABLE

| No. | Treating agent | Percent by Weight* | Dispersing Agent | Peroxide | Percent by Weight* | Treatment Period hours | Temp., °C. | Stability, minutes |
|---|---|---|---|---|---|---|---|---|
| 1 | BF$_3$·O(C$_2$H$_5$)$_2$ | 0.95 | Heptane | Dibenzoylperoxide | 0.1 | 5 | 98 | 112 |
| 2 | BF$_3$ | 0.5 | Hexane | Diacetylperoxide | 0.09 | 4 | 60 | 97 |
| 3 | HCl$_3$·O(C$_2$H$_5$)$_2$ | 0.8 | Heptane | Dicumylperoxide | 0.07 | 4.5 | 98 | 89 |
| 4 | BCl$_3$ | 0.6 | ...do... | Dicumylperoxide | | 5 | 98 | 84 |
| 5 | | | ...do... | Dibenzoylperoxide | 0.1 | 5 | 98 | 58 |
| 6 | BF$_3$·O(C$_2$H$_5$)$_2$ | 1 | ...do... | Di-tert-butylperoxide | 0.1 | 4 | 98 | 12 |
| 7 | | | ...do... | Di-tert-butylperoxide | 0.1 | 4 | 98 | 3 |

*Percent by weight, in each instance, with reference to the amount of polyolefine.

Examples 1–5 of the above table relate to the treatment of polypropylene, whereas Examples 6 and 7 are concerned with the treatment of poly-4-methylpentene-1 which was otherwise obtained and treated in the same manner as polypropylene.

For determination of the stability of the treated polyolefine in the foregoing examples, 30 grams of the polymer powder were ground in a ball mill for a period of 30 minutes with a stabilizing mixture of 0.03 gram dilauryl-thiodipropionate and 0.03 gram of 4,4′-thio-bis-(3-methyl-6-t-butyl-phenol), i.e. 0.1% by weight in each case. 12 grams of this mixture were pressed in a plate press at 170° C. and under a pressure of 350 atm. into a 1 mm. thick plate. The plate was cut into strips 3–4 mm. wide and 30–40 mm. long from which 3 grams were introduced into a test tube standing in an aluminum block maintained at 200±1.5° C. and connected to an oxygen burette. By controlling the volume of oxygen, the time in minutes was determined for the spontaneous absorption of oxygen to begin. This induction period for the oxidation of the polymer at 200° C. in pure oxygen serves as a measure of the stability at room temperature. In the case of poly-4-methylpentene-(1), the measurement was carried out at 230° C. and the oxygen was introduced into the stabilized, unpressed powder contained in the test tube.

Similar results can be achieved under conditions corresponding to the preceding examples by treating the polyolefine wtih boron halide etherates such as

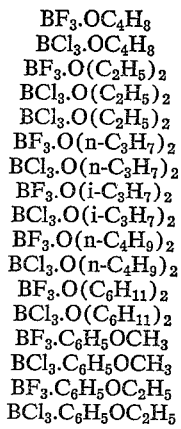

BF$_3$·OC$_4$H$_8$
BCl$_3$·OC$_4$H$_8$
BF$_3$·O(C$_2$H$_5$)$_2$
BCl$_3$·O(C$_2$H$_5$)$_2$
BCl$_3$·O(C$_2$H$_5$)$_2$
BF$_3$·O(n-C$_3$H$_7$)$_2$
BCl$_3$·O(n-C$_3$H$_7$)$_2$
BF$_3$·O(i-C$_3$H$_7$)$_2$
BCl$_3$·O(i-C$_3$H$_7$)$_2$
BF$_3$·O(n-C$_4$H$_9$)$_2$
BCl$_3$·O(n-C$_4$H$_9$)$_2$
BF$_3$·O(C$_6$H$_{11}$)$_2$
BCl$_3$·O(C$_6$H$_{11}$)$_2$
BF$_3$·C$_6$H$_5$OCH$_3$
BCl$_3$·C$_6$H$_5$OCH$_3$
BF$_3$·C$_6$H$_5$OC$_2$H$_5$
BCl$_3$·C$_6$H$_5$OC$_2$H$_5$ and or organic peroxides such as di-t-amyl peroxide, 2,2-bis-(t-butylperoxide)-butane, cumene hydroperoxide, t-butyl hydroperoxide, cyclohexyl hydroperoxide, methylcyclohexyl hydroperoxide, p-menthane hydroperoxide, methylethylketone peroxide, cyclohexanone peroxide, methylamylketone peroxide, acetyl benzoyl peroxide, di-lauroyl peroxide, disuccinyl peroxide, 2,4-dichlorobenzoyl peroxide, dicaproyl peroxide, t-butyl perbenzoate, di-t-butyl perphthalate, t-butyl permaleic acid, isopropyl percarbonate, peracetic acid, dibutyryl peroxide, t-butyl peracetate, hydroxyheptyl peroxide, 1-hydroxycyclohexyl hexane, benzene, toluene, xylene, Decalin, Tetralin, and diesel oil.

The invention is hereby claimed as follows:

1. A process for improving the stability of a high molecular weight poly-α-monoolefine which comprises: dispersing said poly-α-monoolefine as a finely divided powder in an inert hydrocarbon liquid containing a small amount each of
   (A) a boron compound selected from the group consisting of boron halides and boron halide etherates; and
   (B) an organic peroxide;
heating said dispersion with agitation at an elevated temperature up to the boiling point of said inert hydrocarbon liquid for a period of time sufficient to enhance the oxidation-resistance of said poly-α-monoolefine; and separating the poly-α-monoolefine from said dispersion.

2. A process as claimed in claim 1 wherein said boron compound is present in an amount of at least 0.01% by weight, with reference to the poly-α-monoolefine.

3. A process as claimed in claim 2 wherein said organic peroxide is present in an amount of at least 0.001% by weight, with reference to the poly-α-monoolefine.

4. A process as claimed in claim 1 wherein said boron compound is present in an amount of about 0.1 to 1% by weight, with reference to the poly-α-monoolefine.

5. A process as claimed in claim 4 wherein said organic peroxide is present in an amount of about 0.01 to 0.1% by weight, with reference to the poly-α-monoolefine.

6. A process as claimed in claim 1 wherein said dispersion is heated for a period of about 30 minutes up to about 5 hours.

7. A process as claimed in claim 1 wherein said dispersion is heated at a temperature of about 50° C. to 150° C.

8. A process as claimed in claim 1 wherein said dispersion is heated at a temperature of about 60° C. to 120° C.

9. A process as claimed in claim 1 wherein said boron compound is BF$_3$.

10. A process as claimed in claim 1 wherein said boron compound is BCl$_3$.

11. A process as claimed in claim 1 wherein said boron compound is BF$_3$·O(C$_2$H$_5$)$_2$.

12. A process as claimed in claim 1 wherein said boron compound is BCl$_3$·O(C$_2$H$_5$)$_2$.

13. A process as claimed in claim 1 wherein said dispersion is heated for about 30 minutes to 5 hours in the presence of about 0.01 to 1% by weight each of said boron compound and said organic peroxide, the percentage being with reference to the poly-α-monoolefine, at a temperature of about 50° C. to 150° C., and the poly-α-monoolefine is separated from the dispersion and washed with said inert hydrocarbon liquid.

14. A process as claimed in claim 13 wherein said poly-α-monoolefine is polypropylene.

15. A process as claimed in claim 13 wherein said poly-α-monoolefine is poly-4-methylpentene-1.

16. The stabilized poly-α-monoolefine product obtained by the process of claim 1.

17. The stabilized poly-α-monoolefine product obtained by the process of claim 13.

References Cited

UNITED STATES PATENTS

| | | | |
|---|---|---|---|
| 2,861,052 | 11/1958 | Elliott | 260—45.75 |
| 3,082,192 | 3/1963 | Hirschenbaum et al. | 260—88.2 |
| 3,193,521 | 6/1965 | Jasching | 260—45.8 |
| 3,253,058 | 5/1966 | Isley et al. | 260—45.7 X |

FOREIGN PATENTS

| | | |
|---|---|---|
| 735,876 | 8/1955 | Great Britain. |
| 849,027 | 9/1960 | Great Britain. |

DONALD E. CZAJA, *Primary Examiner.*

M. J. WELSH, *Assistant Examiner.*